(12) United States Patent
Zhu et al.

(10) Patent No.: US 8,671,455 B1
(45) Date of Patent: Mar. 11, 2014

(54) SYSTEMS AND METHODS FOR DETECTING UNINTENTIONAL INFORMATION DISCLOSURE

(75) Inventors: Xiaole Zhu, Beijing (CN); Jokul Tian, Beijing (CN)

(73) Assignee: Symantec Corporation, Mountain View, CA (US)

( * ) Notice: Subject to any disclaimer, the term of this patent is extended or adjusted under 35 U.S.C. 154(b) by 55 days.

(21) Appl. No.: 13/240,409

(22) Filed: Sep. 22, 2011

(51) Int. Cl.
*H04L 29/06* (2006.01)
*G06F 21/00* (2013.01)

(52) U.S. Cl.
USPC .............................................. 726/26

(58) Field of Classification Search
None
See application file for complete search history.

(56) References Cited

U.S. PATENT DOCUMENTS 8,224,796 B1 * 7/2012 Shinde et al. ............... 707/695

OTHER PUBLICATIONS

Enck, William et al.; TaintDroid: An Information-Flow Tracking System for Realtime Privacy Monitory on Smartphones; 9th USENIX Symposium on Operating Systems Design and Implementation; Oct. 4, 2010.

* cited by examiner

*Primary Examiner* — Gilberto Barron, Jr.
*Assistant Examiner* — Simon Kanaan
(74) *Attorney, Agent, or Firm* — ALG Intellectual Property, LLC (57) ABSTRACT

A method for detecting unintentional information disclosure. The method may include: 1) identifying at least one data access Application Programming Interface (API) programmed to provide access to sensitive information located on a computing device, 2) monitoring attempts to use the data access API, 3) while monitoring attempts to use the data access API, detecting an attempt by an application to access the sensitive information through the data access API, 4) in response to detecting the attempt to access the sensitive information, tracking the sensitive information accessed by the application, 5) detecting an attempt to leak the sensitive information outside of the computing device, and 6) in response to detecting the attempt to leak the sensitive information outside of the computing device, performing a security action.

19 Claims, 5 Drawing Sheets

FIG. 5

SYSTEMS AND METHODS FOR DETECTING UNINTENTIONAL INFORMATION DISCLOSURE

BACKGROUND

Today, smartphones are as popular for use as communication tools as they are for creating, managing, and interacting with digital information. Smartphones are used, by consumers and business users alike, to communicate via phone call, text message, email, and video conference. Smartphones are also used to manage calendars and contact lists, view and create documents, browse the Internet, record video and audio, take photographs, and make purchases. Consequently, consumers and businesses are increasingly using smartphones to store sensitive information.

Knowing this, unscrupulous developers have begun creating applications that can steal sensitive information from a smartphone without the knowledge or permission of the user of the smartphone. These malicious programs may end up being readily available, usually for free, through popular application store services, where individuals seeking to enhance the functionality of their smartphones may inadvertently download and install them. Such malicious programs may also infect legitimate programs installed on a user's device. And, in some situations, a user may install a legitimate program and may be unaware that the program is designed to access and share sensitive information.

Smartphone systems may implement a variety of technologies to protect sensitive information from malicious programs or from legitimate programs that may access personal information without a user's knowledge. For example, some systems may implement a permission-based scheme where an application must request, before the application can be installed, permission to access sensitive information.

Unfortunately, such permission-based schemes may inadequately protect sensitive information from unintentional disclosure, because once a user grants permission to an application to access sensitive information, the application may use the sensitive information however it likes. An unscrupulous developer may take advantage of this ability by creating an application that requires access to some sensitive information to provide a useful service to the user, but that also steals the user's sensitive information. Furthermore, some users may simply not read or understand what permissions an application is requesting and/or understand the implication of granting certain permissions. Accordingly, the instant disclosure addresses a need for systems and methods that protect sensitive information from unintentional and/or malicious disclosure.

SUMMARY

As will be described in greater detail below, the instant disclosure generally relates to systems and methods for detecting unintentional information disclosure. In one example, a computer-implemented method for detecting unintentional information disclosure may include: 1) identifying at least one data access Application Programming Interface (API) programmed to provide access to sensitive information located on a computing device, 2) monitoring attempts to use the data access API, 3) while monitoring attempts to use the data access API, detecting an attempt, by an application, to access the sensitive information through the data access API, 4) in response to detecting the attempt to access the sensitive information, tracking the sensitive information accessed by the application, 5) detecting an attempt to leak the sensitive information outside of the computing device, and 6) in response to detecting the attempt to leak the sensitive information outside of the computing device, performing a security action.

In some embodiments, the method may further include: 1) identifying at least one data transfer API programmed to send information outside of the computing device, 2) determining whether the application has access to the data transfer API to determine whether the sensitive information should be tracked, 3) determining that the sensitive information should be tracked because the application can access the data transfer API. The method may detect the attempt to leak the sensitive information outside of the computing device by detecting an attempt, by the application, to leak the sensitive information by using the data transfer API.

In various embodiments, the method may track the sensitive information accessed by the application by applying a sensitive-information label to the sensitive information to distinguish between the sensitive information and other information used by the application.

In some embodiments, the method may detect an attempt to leak the sensitive information outside of the computing device by: 1) first monitoring attempts, by the application, to send information outside of the computing device, and 2) while monitoring attempts, by the application, to send information outside of the computing device, detecting the attempt to leak the sensitive information outside of the computing device by identifying the sensitive-information label applied to the sensitive information.

In certain embodiments, the method may further include applying the sensitive-information label to at least one additional instance of the sensitive information. In some embodiments, the additional instance of the sensitive information may include a variable to which the sensitive information has been assigned, a file to which the sensitive information has been stored, and/or an inter-process communication in which the sensitive information has been communicated.

In one embodiment, the method may apply the label to the sensitive information during the attempt, by the application, to access the sensitive information. In various embodiments, the method may apply the sensitive-information label to the sensitive information by storing, in a predetermined memory location, the sensitive-information label and/or a reference to the sensitive information.

In certain embodiments, the method may perform the security action by logging the attempt to leak the sensitive information outside of the computing device, notifying a user of the computing device of the attempt to leak the sensitive information outside of the computing device, notifying a third party of the attempt to leak the sensitive information outside of the computing device, and/or preventing the attempt to leak the sensitive information outside of the computing device.

In at least one embodiment, the method may identify the data access API by determining that one or more applications can use the data access API in order to determine whether to monitor attempts to use the data access API and may monitor attempts to use the data access API in response to determining that one or more applications can use the data access API.

In various embodiments, the data access API may include an account access API, a browser-bookmark access API, a browser-history access API, a calendar access API, a camera access API, a contact access API, a location access API, a message access API, an external-storage access API, a microphone access API, and/or a phone-call access API. In some embodiments, the data transfer API may include a message transfer API, a network transfer API, and/or a phone-call transfer API.

In one embodiment, a system for implementing the above-described method may include 1) an identification module programmed to identify at least one data access API programmed to provide access to sensitive information located on the system, 2) a monitoring module programmed to monitor attempts to use the data access API, 3) an access-attempt-detection module programmed to detect an attempt, by an application, to access the sensitive information through the data access API, 4) a tracking module programmed to track, in response to detecting the attempt to access the sensitive information, the sensitive information accessed by the application, 5) a leak-detection module programmed to detect an attempt to leak the sensitive information outside of the system, 6) a security module programmed to perform, in response to detecting the attempt to leak the sensitive information outside of the system, a security action, and 7) at least one processor configured to execute the identification module, the monitoring module, the access-attempt-detection module, the tracking module, the leak-detection module, and the security module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to: 1) identify at least one data access API programmed to provide access to sensitive information located on the computing device, 2) monitor attempts to use the data access API, 3) while monitoring attempts to use the data access API, detect an attempt, by an application, to access the sensitive information through the data access API, 4) in response to detecting the attempt to access the sensitive information, track the sensitive information accessed by the application, 5) detect an attempt to leak the sensitive information outside of the computing device, and 6) in response to detecting the attempt to leak the sensitive information outside of the computing device, perform a security action.

As will be explained in greater detail below, the systems and methods disclosed herein may protect a user's sensitive information located on a device (e.g., a smartphone, a tablet pc, etc.) by tracking, in real-time, the sensitive information as it is used by applications running on the device and by detecting malicious applications that attempt to steal the user's sensitive information without the user's knowledge and/or permission, while also minimizing the use of system resources.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
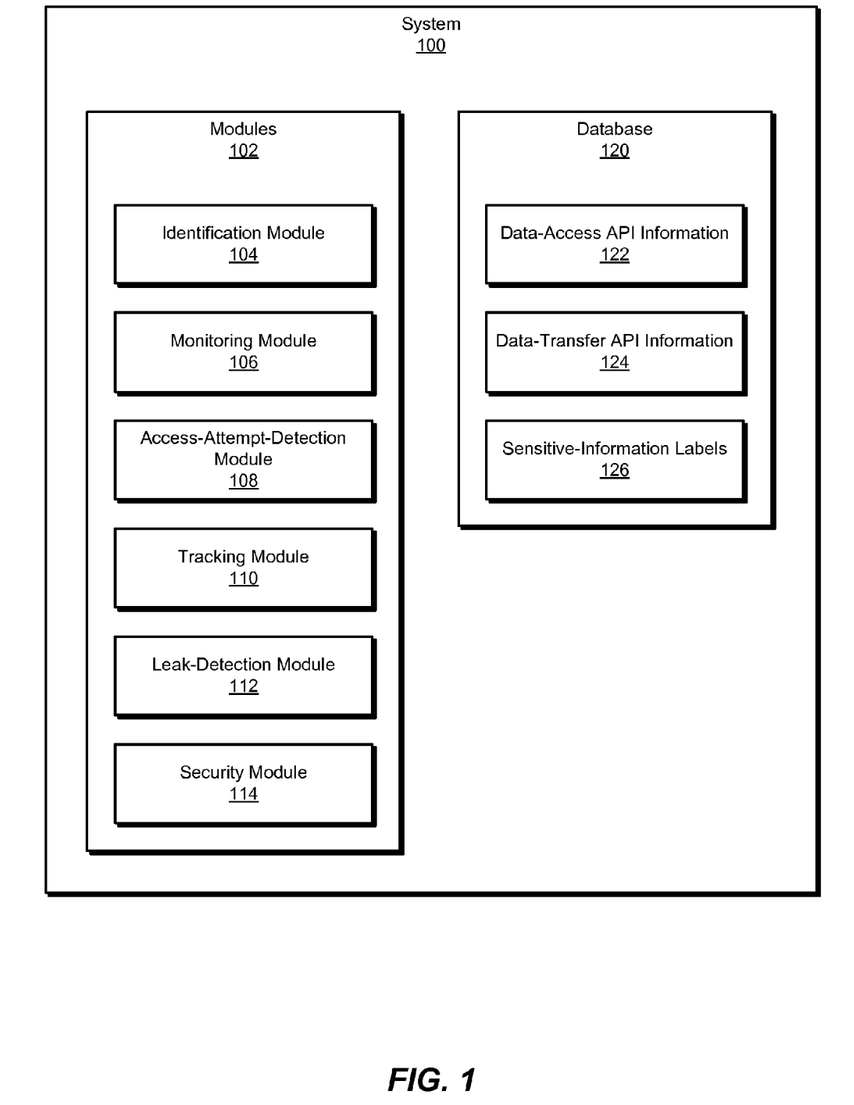
FIG. 1 is a block diagram of an exemplary system for detecting unintentional information disclosure.
Figure 2:
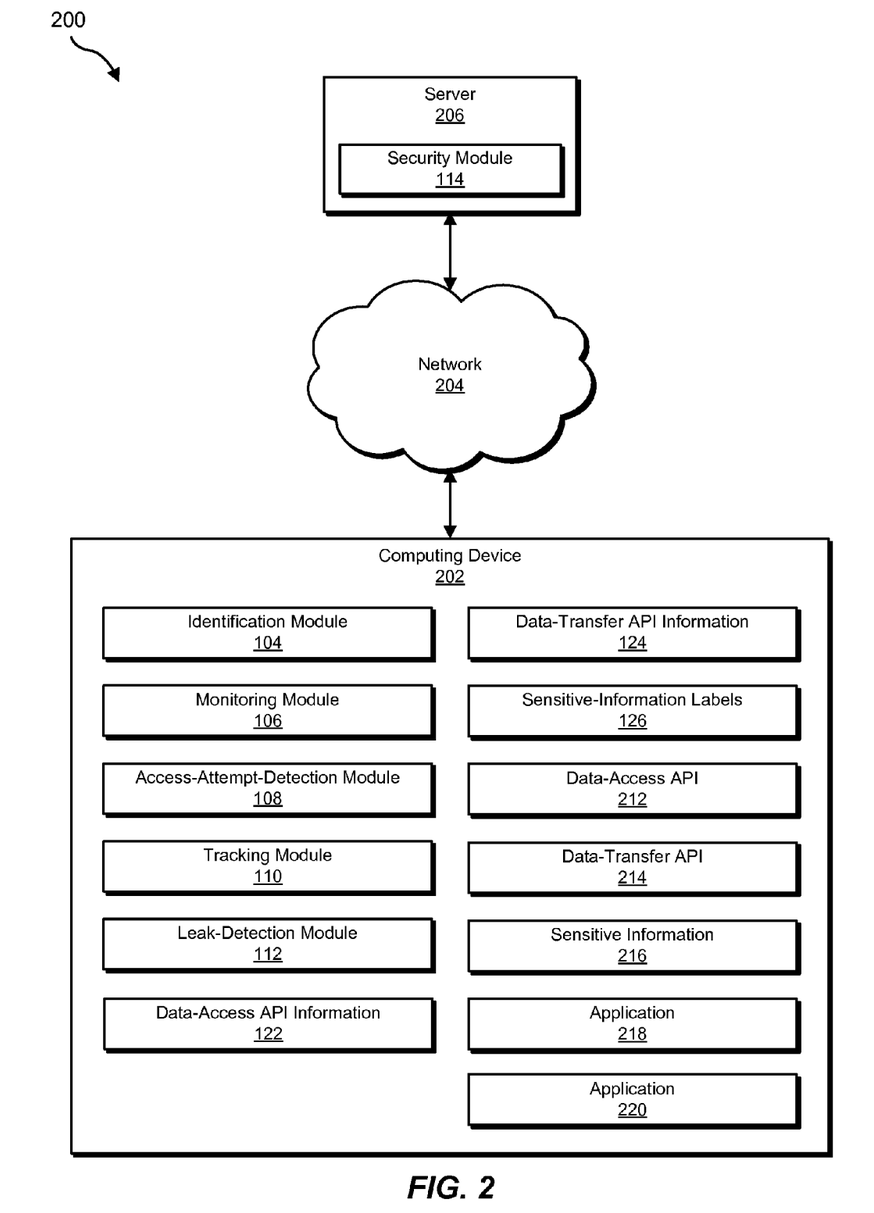
FIG. 2 is a block diagram of an exemplary system for detecting unintentional information disclosure.

The following will provide, with reference to FIGS. 1-2, detailed descriptions of exemplary systems for detecting unintentional information disclosure. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for detecting unintentional information disclosure. As illustrated in this figure, exemplary system 100 may include one or more modules 102 for performing one or more tasks. For example, and as will be explained in greater detail below, exemplary system 100 may include an identification module 104 programmed to identify at least one data access API programmed to provide access to sensitive information. Exemplary system 100 may also include a monitoring module 106 programmed to monitor attempts to use the data access API.

In addition, and as will be described in greater detail below, exemplary system 100 may include an access-attempt-detection module 108 programmed to detect an attempt, by an application, to access the sensitive information through the data access API. Exemplary system 100 may also include a tracking module 110 programmed to track, in response to detecting the attempt to access the sensitive information, the sensitive information accessed by the application.

Exemplary system 100 may also include a leak-detection module 112 programmed to detect an attempt to leak the sensitive information. Exemplary system 100 may further include a security module 114 programmed to perform, in response to detecting the attempt to leak the sensitive information, a security action. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases, such as database 120. For example, and as will be explained in greater detail below, exemplary system 100 may include data-access API information 122 that may include information used to identify data access APIs programmed to provide access to sensitive information. Exemplary system 100 may also include data-transfer API information 124 that may include information used to identify data transfer APIs programmed to send information outside of exemplary system 100. Exemplary system 100 may further include sensitive-information labels 126 that may include information used to track sensitive information (e.g., sensitive-information labels and/or references to sensitive information).

Database 120 may represent portions of a single database or computing device or a plurality of databases or computing devices. For example, database 120 may represent a portion of computing device 202 or server 206 in FIG. 2, computing system 410 in FIG. 4, and/or portions of exemplary network architecture 500 in FIG. 5. Alternatively, database 120 in FIG. 1 may represent one or more physically separate devices capable of being accessed by a computing device, such as server 206 in FIG. 2, computing system 410 in FIG. 4, and/or portions of exemplary network architecture 500 in FIG. 5.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

Computing device 202 generally represents any type or form of computing device capable of reading computer-executable instructions. Examples of computing device 202 include, without limitation, smartphones, laptops, desktops, servers, cellular phones, personal digital assistants (PDAs), multimedia players, embedded systems, combinations of one or more of the same, exemplary computing system 410 in FIG. 4, or any other suitable computing device.

As illustrated in FIG. 2, computing device 202 may include identification module 104, monitoring module 106, access-attempt-detection module 108, tracking module 110, and leak-detection module 112. Modules 104-114 may protect computing device 202 from unintentional leaking of sensitive data. Computing device 202 may also include data-access API information 122, data-transfer API information 124, and sensitive-information labels 126.

In addition, and as will be described in greater detail below, computing device 202 may include a data-access API 212 programmed to provide access to sensitive information (e.g., sensitive information 216) located on computing device 202 and a data-transfer API 214 programmed to send information outside of computing device 202. Computing device 202 may also include sensitive information 216 (e.g., sensitive information belonging to a user of computing device 202).

Computing device 202 may further include applications 218 and 220. Applications 218 and 220 generally represent any type of application capable of being executed on computing device 202. For example, applications 218 and 220 may comprise third-party applications that have been installed on computing device 202 by the user of computing device 202.

Server 206 generally represents any type or form of computing device that is capable of reading computer-executable instructions and performing one or more of the server-side operations described herein. Examples of server 206 include, without limitation, application servers and database servers configured to provide various database services and/or run certain software applications. As illustrated in FIG. 2, server 206 may include security module 114 and may provide one or more security functions for computing device 202. While security module 114 is shown on server 206, in some embodiments security module 114 may be located on computing device 202.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 500 in FIG. 5, or the like. Network 204 may facilitate communication or data transfer using wireless or wired connections. In one embodiment, network 204 may facilitate communication between computing device 202 and server 206.

Figure 3:
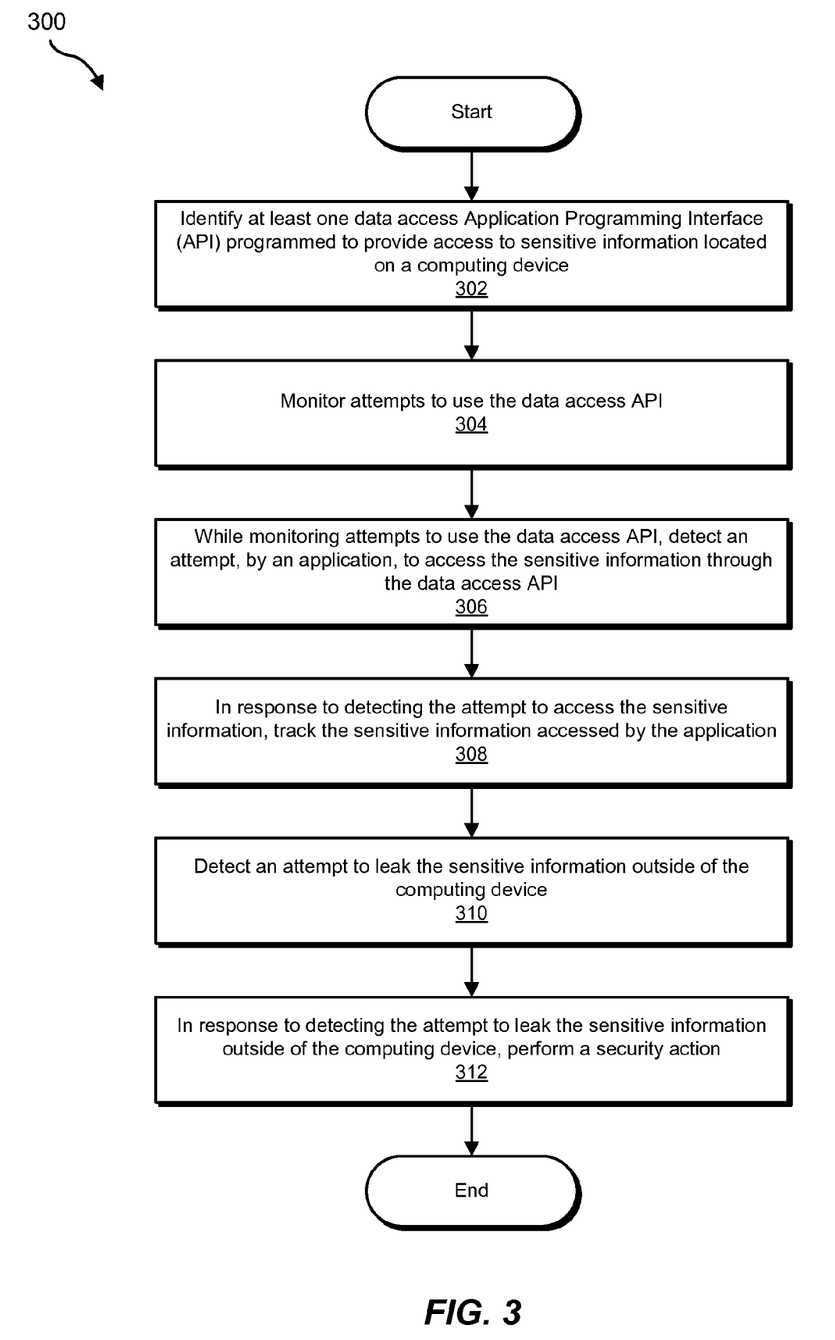
FIG. 3 is a flow diagram of an exemplary method for detecting unintentional information disclosure.

FIG. 3 is a flow diagram of an exemplary computer-implemented method 300 for detecting unintentional information disclosure. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

At step 302, one or more of the system described herein may identify at least one data access API programmed to provide access to sensitive information located on a computing device. For example, identification module 104 may identify data-access API 212, which may be programmed to provide access to sensitive information 216 located on computing device 202.

As used herein, the phrase "sensitive information" may refer to any information that a user and/or company would not want sent outside of the computing device without knowledge and/or permission of the user and/or company. Examples of sensitive information may include, without limitation, a name, a phone number, a device identifier, an email address, a contact, a browser history, a browser cookie, a phone history, a message history, location information (e.g., global positioning system information), financial information (e.g., credit card numbers, bank account numbers, etc.), confidential information, privileged information, personal information (e.g., a social security number, a driver's license number, etc.), sensitive corporate information (e.g., intellectual property, customer lists, product roadmaps, etc.), and/or any other type of sensitive information.

As used herein, the phrase "outside a computing device" may refer to any location external to and/or apart from a computing device. For example, if data is exposed outside a computing device, the data may be transferred to a removable hard drive attached to the computing device, the data may be transferred over a network to which the computing device is connected, the data may be displayed or otherwise provided on an input/output device connected to the computing device, and/or the data may be exposed in any other manner.

Identification module 104 may identify data-access API 212 in a variety of ways. For example, in one embodiment, identification module 104 may identify data-access API 212 based on information contained within data-access API information 122. For example, data-access API information 122 may be a database that identifies all APIs on a device that are capable of accessing sensitive information, and identification module 104 may query the database to identify data-access API 212. In other embodiments, identification module 104 may identify data-access API 212 by scanning the computing device for APIs capable of accessing sensitive information, by being notified by another module or system that the data access API is capable of accessing sensitive information, and/or in any other suitable manner.

As used herein the phrase "data access API" may refer to any code, interface, or other mechanism that an application may use to access sensitive information located on a computing device. For example, a data access API may be a file that includes a set of rules and/or specifications that software applications may use to access data. Examples of data access APIs may include, without limitation, an account-access API programmed to provide access to account information, a browser-bookmark access API programmed to provide access to browser bookmarks, a browser-history access API programmed to provide access to browsing histories, a calendar access API programmed to provide access to calendar events, a camera access API programmed to provide access to a camera sensor, a contact access API programmed to provide access to contact lists, a location access API programmed to provide access to location information (e.g., the GPS location of the computing device), a message access API programmed to provide access to messages sent to or received by the computing device (e.g., text messages or email messages), an external-storage access API programmed to provide access to an external storage device (e.g., a memory card), an internal-storage API programmed to provide access to local memory, a log access API programmed to provide access to system logs, a microphone access API programmed to provide access to a microphone sensor, a phone-call access API programmed to provide access to phone-call information, an inter-process communication API programmed to allow two applications (e.g., applications 218 and 220) to exchange information, a third-party-application API programmed to provide access to third-party-application information, a data-access API with permission requirements, and/or any other data access API programmed to allow direct or indirect access to sensitive information 216.

In some embodiments, identification module 104 may determine, as part of identifying data-access API 212, that one or more applications can use data-access API 212 in order to determine whether to monitor attempts to use data-access API 212 in step 304. For example, identification module 104 may determine that monitoring module 106 should monitor data-access API 212 because application 218 and/or application 220 can use data-access API 212. Alternatively, identification module 104 may determine that monitoring module 106 should not monitor data-access API 212 because there are no applications that can use data-access API 212.

In at least one embodiment, identification module 104 may determine that application 218 can use data-access API 212 by determining that application 218 has been granted permission to request and/or receive sensitive information 216 using data-access API 212. For example, identification module 104 may determine that the user of computing device 202 previously granted permission (either implicitly or explicitly) to application 218 to use data-access API 212 when the user installed application 218 on computing device 202.

At step 304, one or more of the systems described herein may monitor attempts to use the data access API. For example, monitoring module 106 may monitor attempts to use data-access API 212.

Step 304 may be performed in a variety of ways. For example, in one embodiment, monitoring module 106 may monitor attempts to use data-access API 212 by monitoring data-access API 212 as data-access API 212 is invoked by applications, such as application 218 and/or application 220. In another example, monitoring module 106 may monitor attempts to use data-access API 212 by monitoring one or more applications that have been granted permission to access data-access API 212.

In yet another example, monitoring module 106 may conserve system resources on computing device 202 by only monitoring attempts to use data-access API 212 in response to identification module 104 having determined that one or more applications can use data-access API 212 (as described above).

At step 306, one or more of the systems described herein may detect an attempt, by an application, to access the sensitive information through the data access API. The attempt may be detected while monitoring attempts to use the data access API. For example, access-attempt-detection module 108 may detect an attempt, by application 218, to access sensitive information 216 through data-access API 212 while monitoring attempts to use data-access API 212.

Access-attempt-detection module 108 may detect the attempt to access sensitive information 216 through data-access API 212 in a variety of ways. For example, access-attempt-detection module 108 may detect the attempt by detecting a request, received from application 218 using data-access API 212, for sensitive information 216. In another example, access-attempt-detection module 108 may detect the attempt by detecting that data-access API 212 has been invoked.

At step 308, one or more of the systems described herein may, in response to detecting the attempt to access the sensitive information, track the sensitive information accessed by the application. For example, tracking module 110 may track sensitive information 216 accessed by application 218.

Tracking module 110 may track sensitive information 216 in a variety of ways. For example, tracking module 110 may track sensitive information 216 as sensitive information 216 propagates through computing device 202 by tracking variables to which sensitive information 216 is assigned. Additionally or alternatively, tracking module 110 may track files, registers or memory locations to which sensitive information 216 is stored. Tracking module 110 may also track inter-process communications in which sensitive information 216 is communicated.

In certain embodiments, tracking module 110 may track sensitive information 216 by applying a sensitive-information label to sensitive information 216 to distinguish between sensitive information 216 and other information used by application 218. For example, tracking module 110 may apply a sensitive-information label to one or more variables assigned to sensitive information 216. Tracking module 110 may additionally or alternatively apply a sensitive-information label to files, registers and/or memory locations to which sensitive information 216 has been stored. Tracking module 110 may also apply a sensitive-information label to inter-process communications in which sensitive information 216 has been communicated.

In some embodiments, tracking module 110 may apply the sensitive-information label to sensitive information 216 by storing, in a predetermined memory location, the sensitive-information label and/or a reference to the sensitive information. For example, tracking module 110 may store the sensitive-information label in database 120. Thus, the sensitive-information label may be stored apart from sensitive information 216 and/or in a memory location unrelated to the memory location where sensitive information 216 is stored.

In various embodiments, the sensitive-information label may indicate that sensitive information 216 is sensitive information, and/or contain information about the use of sensitive information 216 by application 218. For example, the sensitive-information label may indicate a type (e.g., confidential information, personal information, etc.) of sensitive information 216, may indicate that data-access API 212 was used to access sensitive information 216, and/or may indicate any other information useful in tracking sensitive information 216.

In certain embodiments, tracking module 110 may track sensitive information 216 by applying the sensitive-information label to an additional instance of sensitive information 216. In some embodiments, the additional instance of sensitive information 216 may include a variable to which sensitive information 216 has been assigned, a file to which sensitive information 216 has been stored, and/or an inter-process communication in which sensitive information 216 has been communicated. For example, if application 218 assigns sensitive information 216 to a variable x (e.g., variable x=sensitive information 216), tracking module 110 may apply the sensitive-information label to variable x. Similarly, if application 218 writes sensitive information 216 to a file y, tracking module 110 may apply the sensitive-information label to file y.

In some embodiments, tracking module 110 may apply the sensitive-information label to sensitive information 216 during the attempt, by application 218, to access sensitive information 216. For example, tracking module 110 may apply the sensitive-information label to sensitive information 216 when application 218 requests sensitive information 216, when data-access API sends sensitive information 216, and/or when application 218 receives sensitive information 216.

In various embodiments, tracking module 110 may first determine whether sensitive information 216 should be tracked before tracking sensitive information 216. For example, if application 218 cannot leak sensitive information 216 outside of computing device 202, either directly or indirectly, tracking module 110 may not track the use of sensitive information 216 by application 218.

In one embodiment, identification module 104 may determine whether sensitive information 216 should be tracked by identifying at least one data transfer API programmed to send information outside of the computing device. For example, identification module 104 may identify data-transfer API 214. Identification module 104 may identify data-transfer API 214 in a variety of ways. For example, identification module 104 may identify data-transfer API 214 based on information contained within data-transfer API information 124. Examples of data-transfer API 214 include, without limitation, a message transfer API programmed to allow an application to send messages outside of computing device 202, a network transfer API programmed to allow an application to send information outside of computing device 202 over a network (e.g., network 204), a phone-call transfer API programmed to allow an application to make phone calls, an external-storage access API programmed to allow an application to write information to an external-storage device, an internal-storage API programmed to allow an application to write information to internal storage, and/or any other means of directly or indirectly sending information outside of computing device 202.

After identification module 104 identifies data-transfer API 214, tracking module 110 may determine whether the application has access to data-transfer API 214 to determine whether sensitive information 216 should be tracked. In at least one embodiment, tracking module 110 may determine that sensitive information 216 should be tracked because application 218 can directly or indirectly access data-transfer API 214. For example, tracking module 110 may determine whether application 218 has access to data-transfer API 214 by determining that application 218 has permission to send information using data-transfer API 214. As another example, tracking module 110 may determine that application 218 may not have access to data-transfer API 214 directly but may have access to data-transfer API 214 indirectly by determining that application 218 is capable of sending data to another application (e.g., application 220) that has access to data-transfer API 214.

At step 310, one or more of the systems described herein may detect an attempt to leak the sensitive information outside of the computing device. For example, leak-detection module 112 may detect an attempt to leak sensitive information 216 outside of computing device 202.

Step 310 may be performed in a variety of ways. For example, leak-detection module 112 may detect an attempt to leak sensitive information 216 outside of computing device 202 by 1) monitoring attempts by application 218 to send information outside of computing device 202, and 2) by determining that the information comprises sensitive information 216. Leak-detection module 112 may monitor attempts by application 218 to send information outside of computing device 202 by monitoring application 218 and/or by monitoring attempts by application 218 to send information outside of computing device 202 using data-transfer API 214.

In at least embodiment, leak-detection module 112 may detect the attempt to leak sensitive information 216 by: 1) monitoring attempts, by application 218, to send information outside of computing device 202, and 2) while monitoring attempts, by application 218, to send information outside of computing device 202, detecting the attempt to leak sensitive information 216 outside of computing device 202 by identifying the sensitive-information label that was applied to sensitive information 216 as part of step 308.

At step 312, one or more of the systems described herein may, in response to detecting the attempt to leak the sensitive information outside of the computing device, perform a security action. For example, security module 114 may perform a security action with respect to sensitive information 216.

Security module 114 may perform the security action in a variety of ways. For example, security module 114 may perform the security action by logging the attempt to leak sensitive information 216 outside of computing device 202. In the log, security module 114 may identify the application that attempted to leak sensitive information 216, how the application accessed or used sensitive information 216, and/or the destination to which the application attempted to leak sensitive information 216. Security module 114 may also store the log to a log file, a database, and/or to a memory location on computing device 202. Security module 114 may further send the log to server 206, to an administrator, and/or to any other destination.

In one embodiment, security module 114 may perform the security action by notifying a user of computing device 202 of the attempt to leak sensitive information 216 outside of computing device 202. For example, security module 114 may present a notification, to the user of computing device 202, indicating that the attempt to leak sensitive information 216 was detected. Security module 114 may also enable the user of computing device 202 to prevent the leak of sensitive information 216 (e.g., by querying the user about whether to allow the information to be transmitted outside of computing device 202).

In another embodiment, security module 114 may perform the security action by notifying a third party of the attempt to leak sensitive information 216 outside of computing device

202. For example, security module 114 may notify an operating system provider, a security vendor, an application store provider, and/or a cellular provider about the attempt to leak sensitive information 216.

In some embodiments, security module 114 may perform the security action by preventing the attempt to leak sensitive information 216 outside of computing device 202. For example, security module 114 may prevent the attempt, by application 218, to leak sensitive information 216 by quarantining application 218, by removing application 218 from computing device 202, by preventing application 218 from sending any information outside of computing device 202, and/or by preventing application 218 from sending any information outside of computing device 202 that comprises sensitive information 216. Upon completion of step 312, exemplary method 300 in FIG. 3 may terminate.

Figure 4:
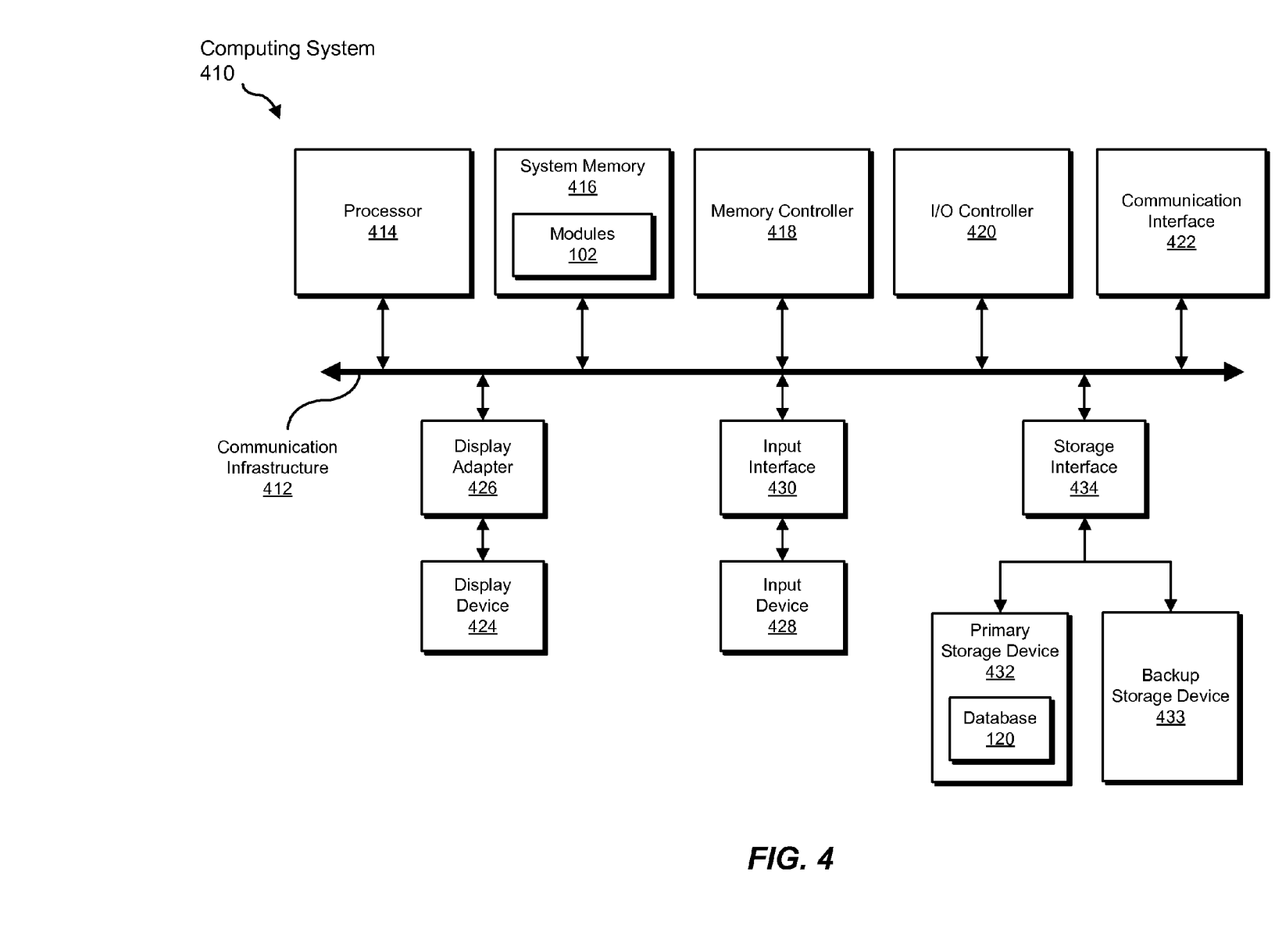
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the detecting, identifying, monitoring, tracking, performing, determining, applying, storing, logging, notifying, and preventing steps described herein. All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410.

Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, database 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 410. All or a portion of the computer program stored on the computer-readable-storage medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
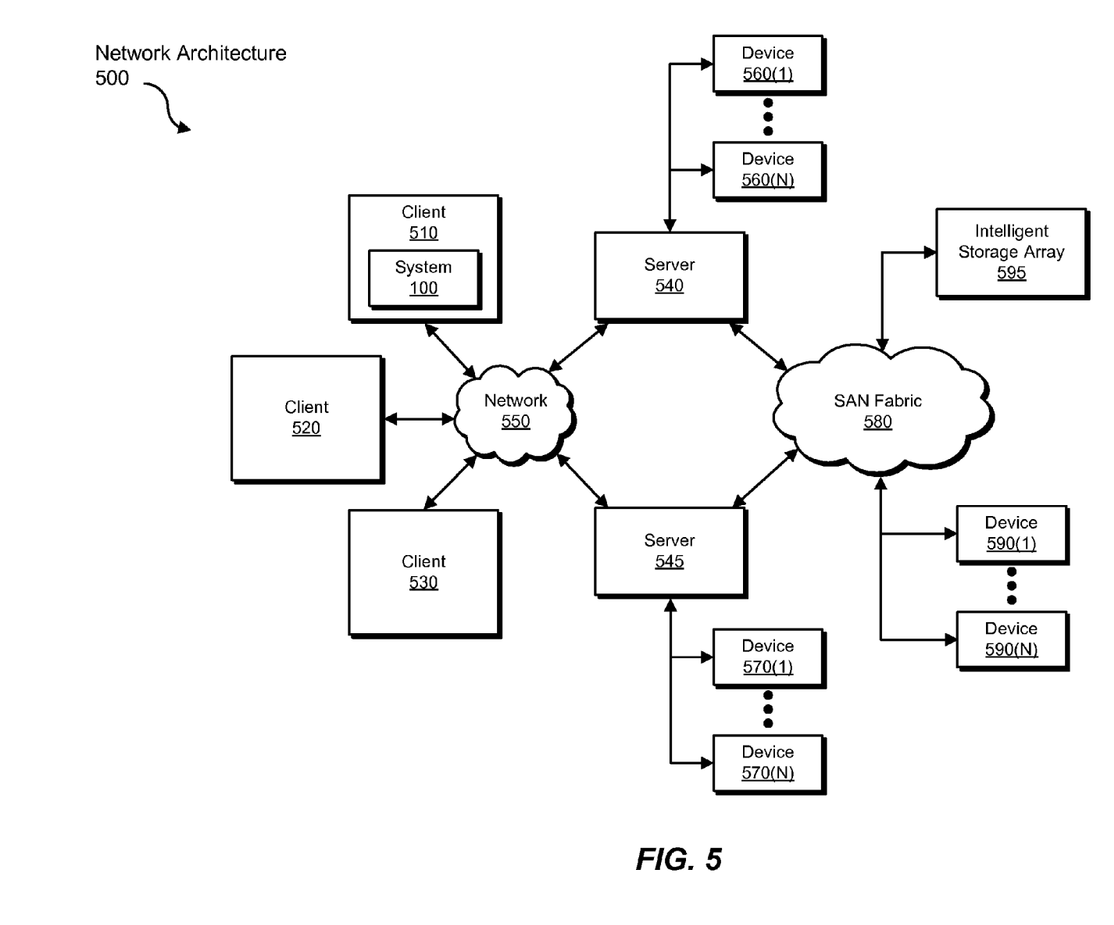
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the detecting, identifying, monitoring, tracking, performing, determining, applying, storing, logging, notifying, and preventing steps disclosed herein. All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590

(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for detecting unintentional information disclosure.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform information about how an application uses sensitive information into a sensitive-information label for tracking the sensitive information.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting unintentional information disclosure, at least a portion of the method being performed by a computing device comprising at least one processor, the method comprising:
   identifying at least one data access Application Programming Interface (API) programmed to provide access to sensitive information located on the computing device to one or more applications;
   determining that at least one application has been granted permission to use the data access API by determining that a user of the computing device granted the application permission to use the data access API;
   monitoring, in response to determining that the application has been granted permission to use the data access API, attempts by the application to use the data access API;
   while monitoring attempts to use the data access API, detecting an attempt by the application to access the sensitive information through the data access API;
   in response to detecting the attempt to access the sensitive information, tracking the sensitive information accessed by the application;
   detecting an attempt to leak the sensitive information outside of the computing device;
   in response to detecting the attempt to leak the sensitive information outside of the computing device, performing a security action.

2. The computer-implemented method of claim 1, further comprising:
   identifying at least one data transfer API programmed to send information outside of the computing device;
   determining whether the application has access to the data transfer API to determine whether the sensitive information should be tracked;
   determining that the sensitive information should be tracked because the application can access the data transfer API, wherein detecting the attempt to leak the sensitive information outside of the computing device comprises detecting an attempt, by the application, to leak the sensitive information by using the data transfer API.

3. The computer-implemented method of claim 2, wherein the data transfer API comprises at least one of:
   a message transfer API;
   a network transfer API;
   a phone-call transfer API.

4. The computer-implemented method of claim 1, wherein tracking the sensitive information accessed by the application comprises applying a sensitive-information label to the sensitive information to distinguish between the sensitive information and other information used by the application.

5. The computer-implemented method of claim 4, wherein detecting an attempt to leak the sensitive information outside of the computing device comprises:
   monitoring attempts, by the application, to send information outside of the computing device;
   while monitoring attempts, by the application, to send information outside of the computing device, detecting the attempt to leak the sensitive information outside of the computing device by identifying the sensitive-information label applied to the sensitive information.

6. The computer-implemented method of claim 4, further comprising applying the sensitive-information label to at least one additional instance of the sensitive information.

7. The computer-implemented method of claim 6, wherein the additional instance of the sensitive information comprises at least one of:
   a variable to which the sensitive information has been assigned;
   a file to which the sensitive information has been stored;
   an inter-process communication in which the sensitive information has been communicated.

8. The computer-implemented method of claim 4, wherein applying the sensitive-information label to the sensitive information occurs during the attempt, by the application, to access the sensitive information.

9. The computer-implemented method of claim 4, wherein applying the sensitive-information label to the sensitive information comprises:
   storing, in a predetermined memory location, at least one of:
      the sensitive-information label;
      a reference to the sensitive information.

10. The computer-implemented method of claim 1, wherein performing the security action comprises at least one of:
    logging the attempt to leak the sensitive information outside of the computing device;
    notifying a user of the computing device of the attempt to leak the sensitive information outside of the computing device;
    notifying a third party of the attempt to leak the sensitive information outside of the computing device;
    preventing the attempt to leak the sensitive information outside of the computing device.

11. The computer-implemented method of claim 1, wherein the data access API comprises at least one of:
    an account access API;
    a browser-bookmark access API;
    a browser-history access API;
    a calendar access API;
    a camera access API;
    a contact access API;
    a location access API;
    a message access API;
    an external-storage access API;
    a microphone access API;
    a phone-call access API.

12. A system for detecting unintentional information disclosure, the system comprising:
    an identification module programmed to identify at least one data access Application Programming Interface (API) programmed to provide access to sensitive information located on the system to one or more applications;
    a monitoring module programmed to:
       determine that at least one application has been granted permission to use the data access API by determining that a user of the system granted the application permission to use the data access API;
       monitor, in response to determining that the application has been granted permission to use the data access API, attempts by the application to use the data access API;
    an access-attempt-detection module programmed to detect an attempt, by the application, to access the sensitive information through the data access API;
    a tracking module programmed to track, in response to detecting the attempt by the application to access the sensitive information, the sensitive information accessed by the application;
    a leak-detection module programmed to detect an attempt to leak the sensitive information outside of the system;
    a security module programmed to perform, in response to detecting the attempt to leak the sensitive information outside of the system, a security action;
    at least one processor configured to execute the identification module, the monitoring module, the access-attempt-detection module, the tracking module, the leak-detection module, and the security module.

13. The system of claim 12, wherein:
    the identification module is programmed to:
       identify at least one data transfer API programmed to send information outside of the system;
    the tracking module is programmed to:
       determine whether the application has access to the data transfer API to determine whether the sensitive information should be tracked;
       determine that the sensitive information should be tracked because the application can access the data transfer API;
    the leak-detection module is programmed to:
       detect an attempt, by the application, to leak the sensitive information through the data transfer API.

14. The system of claim 12, wherein the tracking module is programmed to track the sensitive information accessed by the application by applying a sensitive-information label to the sensitive information to distinguish between the sensitive information and other information used by the application.

15. The system of claim 14, wherein the leak-detection module is programmed to detect an attempt to leak the sensitive information outside of the system by:
    monitoring attempts, by the application, to send information outside of the system;
    while monitoring attempts, by the application, to send information outside of the system, detecting the attempt to leak the sensitive information outside of the system by identifying the sensitive-information label applied to the sensitive information.

16. The system of claim 14, wherein the tracking module is programmed to apply the sensitive-information label to at least one additional instance of the sensitive information.

17. The system of claim 14, wherein the tracking module is programmed to apply the sensitive-information label to the sensitive information by:
    storing, in a predetermined memory location, at least one of:
       the sensitive-information label;
       a reference to the sensitive information.

18. The system of claim 12, wherein the security module is programmed to perform the security action by performing at least one of:

logging the attempt to leak the sensitive information outside of the system;

notifying a user of the system of the attempt to leak the sensitive information outside of the system;

notifying a third party of the attempt to leak the sensitive information outside of the system;

preventing the attempt to leak the sensitive information outside of the system.

19. A non-transitory computer-readable-storage medium comprising one or more computer-executable instructions that, when executed by at least one processor of a computing device, cause the computing device to:

identify at least one data access Application Programming Interface (API) programmed to provide access to sensitive information located on the computing device to one or more applications;

determine that at least one application has been granted permission to use the data access API by determining that a user of the computing device granted the application permission to use the data access API;

monitor, in response to determining that the application has been granted permission to use the data access API, attempts by the application to use the data access API;

while monitoring attempts to use the data access API, detect an attempt by the application to access the sensitive information through the data access API;

in response to detecting the attempt to access the sensitive information, track the sensitive information accessed by the application;

detect an attempt to leak the sensitive information outside of the computing device;

in response to detecting the attempt to leak the sensitive information outside of the computing device, perform a security action.

* * * * *